United States Patent
Efrat et al.

(10) Patent No.: US 10,745,292 B2
(45) Date of Patent: Aug. 18, 2020

(54) WATER TREATMENT SYSTEM USING MECHANICAL VAPOUR COMPRESSION

(71) Applicant: I.D.E. TECHNOLOGIES LTD, Kadima (IL)

(72) Inventors: Tomer Efrat, Kadima (IL); Alex Drak, Kadima (IL)

(73) Assignee: I.D.E. TECHNOLOGIES LTD, Kadima (IL)

( * ) Notice: Subject to any disclaimer, the term of this patent is extended or adjusted under 35 U.S.C. 154(b) by 0 days.

(21) Appl. No.: 16/099,415

(22) PCT Filed: Jul. 10, 2017

(86) PCT No.: PCT/IB2017/054138
§ 371 (c)(1),
(2) Date: Nov. 6, 2018

(87) PCT Pub. No.: WO2018/011695
PCT Pub. Date: Jan. 18, 2018

(65) Prior Publication Data
US 2019/0210890 A1    Jul. 11, 2019

(30) Foreign Application Priority Data
Jul. 11, 2016 (GB) .................................. 1611991.9

(51) Int. Cl.
*C02F 1/04* (2006.01)
*B01D 1/28* (2006.01)
(Continued)

(52) U.S. Cl.
CPC ................ *C02F 1/041* (2013.01); *B01D 1/26* (2013.01); *B01D 1/28* (2013.01); *B01D 1/289* (2013.01);
(Continued)

(58) Field of Classification Search
CPC ..... C02F 1/041; B01D 1/2887; B01D 1/2893; B01D 5/006; B01D 5/0069
See application file for complete search history.

(56) References Cited

U.S. PATENT DOCUMENTS 6,365,005 B1 * 4/2002 Schleiffarth ......... B01D 1/2818
159/24.1
6,536,523 B1 * 3/2003 Kresnyak ............. B01D 1/0047
166/266

(Continued)

FOREIGN PATENT DOCUMENTS

| CN | 102641607 A | 8/2012 |
|---|---|---|
| EP | 0074438 A1 | 3/1983 |
| WO | WO-2014042842 A1 * | 3/2014 |

OTHER PUBLICATIONS

Espacenet translation of CN 10264607 obtained Oct. 11, 2019. (Year: 2019).*

(Continued)

*Primary Examiner* — Jonathan Miller
(74) *Attorney, Agent, or Firm* — Fresh IP PLC; Aubrey Y Chen

(57) ABSTRACT

A water treatment system comprising a mechanical vapour compression apparatus (11), the mechanical vapour apparatus having a evaporation/condensation vessel (11a) and a recirculation circuit (20) whereby recirculated water is pumped from an outlet (18a) of the evaporation/condensation vessel (11A) to an inlet (18B) of the evaporation/condensation vessel (11A), wherein the recirculation circuit (20) comprises a fluidized bed crystallizer (22), and at least part of the recirculated brine is passed through the fluidized bed crystallizer (22) to remove dissolved minerals therefrom.

7 Claims, 3 Drawing Sheets

(51) Int. Cl.
*B01D 5/00* (2006.01)
*B01D 1/26* (2006.01)
*C02F 1/52* (2006.01)
*B01D 9/00* (2006.01)
*C02F 101/10* (2006.01)

(52) U.S. Cl.
CPC ......... *B01D 1/2887* (2013.01); *B01D 1/2893* (2013.01); *B01D 5/006* (2013.01); *B01D 5/0057* (2013.01); *B01D 5/0069* (2013.01); *B01D 5/0075* (2013.01); *C02F 1/52* (2013.01); *B01D 1/2884* (2013.01); *B01D 9/0036* (2013.01); *C02F 2001/5218* (2013.01); *C02F 2101/10* (2013.01); *C02F 2301/043* (2013.01); *C02F 2301/046* (2013.01); *C02F 2301/08* (2013.01); *C02F 2303/22* (2013.01)

(56) References Cited

U.S. PATENT DOCUMENTS

| | | | | |
|---|---|---|---|---|
| 7,077,201 | B2 * | 7/2006 | Heins | C02F 1/04 166/266 |
| 7,428,926 | B2 * | 9/2008 | Heins | C02F 1/04 166/266 |
| 7,438,129 | B2 * | 10/2008 | Heins | C02F 1/04 166/266 |
| 7,717,174 | B2 * | 5/2010 | Heins | C02F 1/04 166/267 |
| 9,085,471 | B2 * | 7/2015 | Mandigo | C02F 1/041 |
| 10,131,561 | B2 * | 11/2018 | Xia | C02F 9/00 |
| 10,132,145 | B2 * | 11/2018 | Xia | E21B 43/40 |
| 2008/0083605 | A1 * | 4/2008 | Holtzapple | C02F 1/041 203/11 |
| 2009/0056940 | A1 | 3/2009 | Minnich | |
| 2011/0000777 | A1 * | 1/2011 | Zhou | B01D 1/0041 202/180 |
| 2012/0048803 | A1 | 3/2012 | Shapiro | |
| 2012/0118722 | A1 * | 5/2012 | Holtzapple | B01D 1/12 203/11 |
| 2012/0193213 | A1 * | 8/2012 | James | B01D 1/065 203/10 |
| 2015/0000914 | A1 * | 1/2015 | Mandigo | C02F 1/041 166/303 |
| 2015/0345278 | A1 * | 12/2015 | Schooley | E21B 43/40 166/267 |

OTHER PUBLICATIONS

International Search Report dated Sep. 12, 2017 for PCT/IB2017/054138.

* cited by examiner

WATER TREATMENT SYSTEM USING MECHANICAL VAPOUR COMPRESSION

This application claims the benefit of Great Britain Patent Application No. 1611991.9, filed Jul. 11, 2016, which is hereby incorporated by reference in its entirety.

This invention relates to a water treatment system and a method of treating water.

BACKGROUND OF THE INVENTION

In a mechanical vapour compression water treatment apparatus, drive is applied to a compressor to compress and drive vapour within a system. The system continually recycles and maintains the latent heat exchanged in evaporation and condensation within the system, where the heat required to evaporate the feed water which flows on one side of a heat transfer surface is supplied through the simultaneous condensation of product on the other side of the surface.

A limiting factor in the operating temperature of the system, and hence in the efficiency of recovery of the system and its cost-effectiveness, arises from the presence in the feed water of dissolved minerals. In sea water, a particular problem is calcium carbonate ($CaCO_3$). At higher temperatures, the calcium carbonate is more likely to be precipitated, forming scale on the internal component of the system, reducing its efficiency. Scaling requires one or more of periodic cleaning of the apparatus or treatment with chemicals to reduce the scale, both of which are undesirable and result in down time for the system.

SUMMARY OF THE INVENTION

According to a first aspect of the invention there is provided a water treatment system comprising a mechanical vapour compression apparatus, the mechanical vapour apparatus having a evaporation/condensation vessel and a recirculation circuit whereby recirculated water is pumped from an outlet of the evaporation/condensation vessel to an inlet of the evaporation/condensation vessel, wherein the recirculation circuit comprises a fluidized bed crystallizer, and at least part of the recirculated brine is passed through the fluidized bed crystallizer to remove dissolved minerals therefrom.

The dissolved minerals may comprise one or more of magnesium compounds and calcium compounds.

The mechanical vapour compression apparatus may comprise a plurality of effects, each effect having an associated recirculation circuit, wherein at least one of the effects may be connected to a fluidized bed crystallizer in its recirculation circuit.

The water treatment apparatus may have a salt removal outlet, to receive removed minerals from the fluidized bed crystallizer.

The water treatment apparatus may comprise a feed water inlet, the feed water inlet being connected to a deaerator having a feed water output, the feed water output being connected to the recirculation circuit.

The recirculation circuit may have a first section and a second section, the first section comprising a bypass section and the fluidized bed crystallizer being located in the second section, whereby part of the recirculated water passes through the first section and part of the recirculated water passes through the second section.

An auxiliary pump may be located in the second section.

The water treatment apparatus may comprise a post-treatment apparatus, the post-treatment apparatus being disposed to receive product water from the mechanical vapour compression apparatus, and being operable to reintroduce minerals from the fluidized bed crystallizer to the product water.

The water treatment apparatus may further comprise a pre-treatment apparatus to treat the feed water before passing the feed water to the mechanical vapour compression apparatus.

According to a second aspect of the invention there is provided a method of treating water, comprising, supplying feed water to a mechanical vapour compression apparatus having a evaporation/condensation vessel, receiving feed water from an outlet of the evaporation/condensation vessel, passing at least part of the feed water through a fluidized bed crystallizer, and supplying the feed water to an inlet of the evaporation/condensation vessel.

The dissolved minerals comprise one or more of magnesium compounds and calcium compounds.

The method may comprise receiving removed dissolved minerals from the fluidized bed crystallizer.

The method may comprise comprising receiving feed water, supplying the feed water to a deaerator and passing at least some of the feed water from the deaerator to the fluidized bed crystallizer.

The method may comprise post-treating product water from the mechanical vapour compression apparatus, comprising receiving product water from the mechanical vapour compression apparatus, and reintroducing minerals from the fluidized bed crystallizer to the product water.

BRIEF DESCRIPTION OF THE DRAWINGS

Embodiments of the invention are described by way of example only with reference to the accompanying drawings, wherein.

DETAILED DESCRIPTION OF THE PREFERRED EMBODIMENTS

Figure 1:
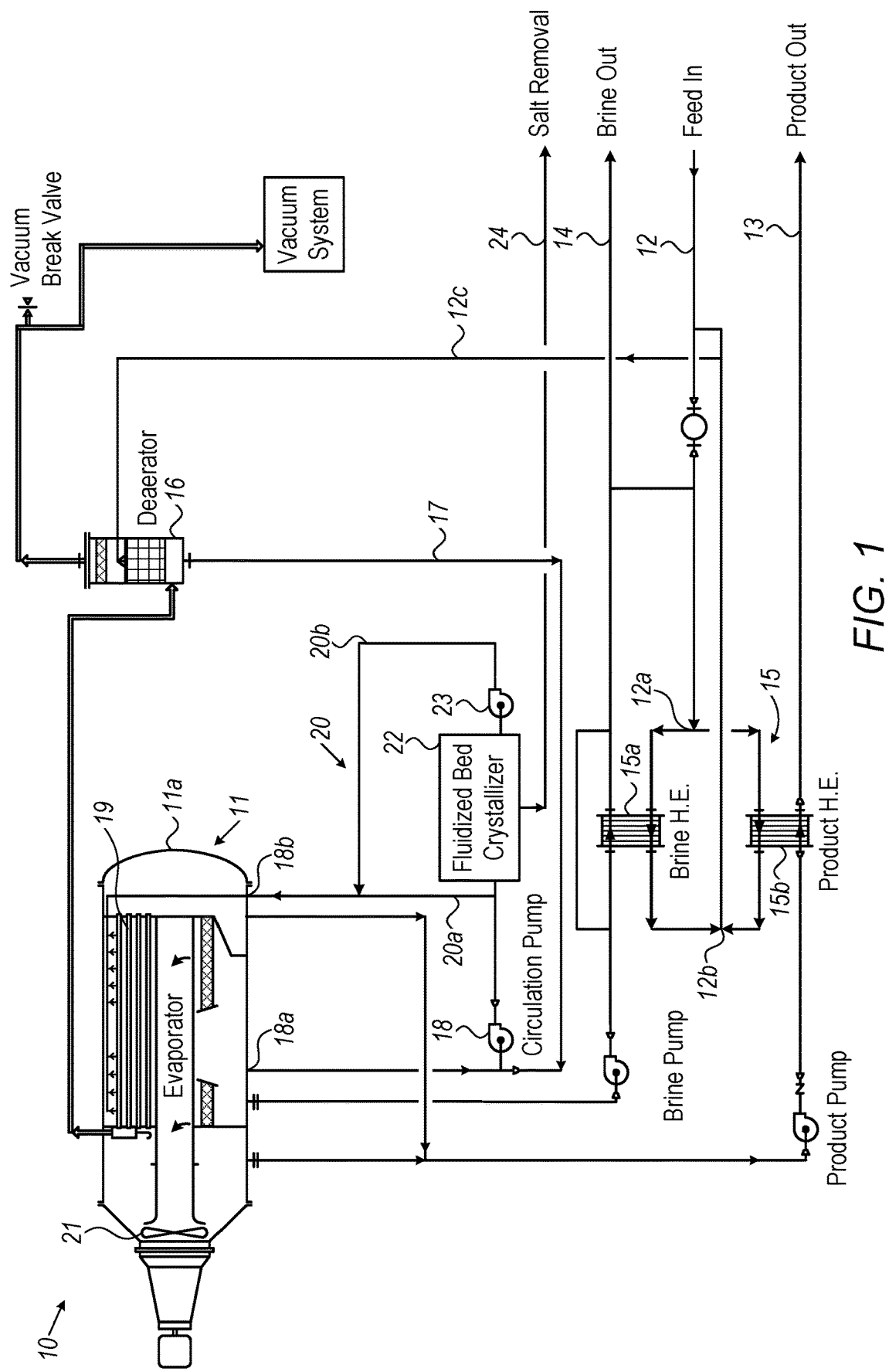
FIG. 1 is an illustration of a water treatment system comprising a mechanical vapour compression water treatment apparatus and a fluidized bed crystallizer.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

In FIG. 1, a water treatment system is generally shown at 10. The system 10 comprises a mechanical vapour compression ("MVC") water treatment apparatus generally shown at 11 comprising a evaporation/condensation vessel 11a. Feed water is supplied to the MVC water treatment apparatus 11 at feed water inlet 12. The apparatus 11 has a product outlet 13 where purified or distilled water is returned from the apparatus and a brine outlet 14 where concentrated brine is discharged from the apparatus. The system further comprises a primary heat exchanger shown at 15, where the feed water is in brought into thermal contact with at least one of the product and brine outlets 13, 14 to heat the feed water. In this example, the primary heat exchanger 15 is a two-part heat exchanger having a first heat exchanger 15a in contact with the brine outlet and a second heat exchanger 15b in contact with the product outlet. The feed water inlet 12 splits as shown at 12a so that a part of the feed water passes through a respective one of the heat exchangers 15a, 15b. As shown at 12b the outlet from each heat exchanger 15a, 15b is combined and passed on line 12c to deaerator 16. The deaerator 16 serves to remove gas from the feed water and also removes any insoluble gas components from the interior of the MVC apparatus 11.

Line 17 then supplies the feed water to the MVC water treatment apparatus 11. Pump 18 circulates the feed water within effect 19 of the MVC water treatment apparatus 11 by passing feed water through a recirculation circuit 20. The pump 18 receives feed water from outlet 18a at a lower part of the evaporation/condensation vessel 11a and returns it to inlet 18b of the evaporation/condensation vessel 11a. Although one effect 19 is shown, the MVC water treatment apparatus 11 may have two or more effects as desired with corresponding recirculation circuits, and at least one effect is connected to a fluidized bed crystallizer in its recirculation circuit as discussed below. In conventional manner, the MVC water treatment apparatus 11 comprises a mechanical vapour compressor 21.

To remove dissolved minerals, a fluidized bed crystallizer 22 is provided in the recirculation circuit 20. In a fluidized bed crystallizer, water to be treated is forced upwardly through a bed of seed particles such as sand, so that the seed particles are in suspension. Dissolved minerals precipitate onto the seed particles and fall to a lower part of the apparatus, thus reducing the dissolved solid in the feed water and allow the precipitated minerals to be easily removed.

In this example, only a part of the recycled feed water is passed through the fluidized bed crystallizer 22 and so the recirculation circuit comprises a first section 20a and a second section 20b connected in parallel. The fluidized bed crystallizer is located in second section 20b. In this example, an auxiliary pump 23 is located in the second section 20b, downstream of the fluidized bed crystallizer 22. It will be apparent that the relative proportion of feed water passing through first and second sections 20a, 20b can be controlled by controlling auxiliary pump 23. A salt removal line 24 is connected to the fluidized bed crystallizer 22, to receive the removed minerals.

Accordingly, by passing the recycled feed water through the fluidized bed crystallizer in this way, the total dissolved solids in the feed water can be reduced and the operating temperature in the evaporation/condensation vessel increased.

Figure 2:
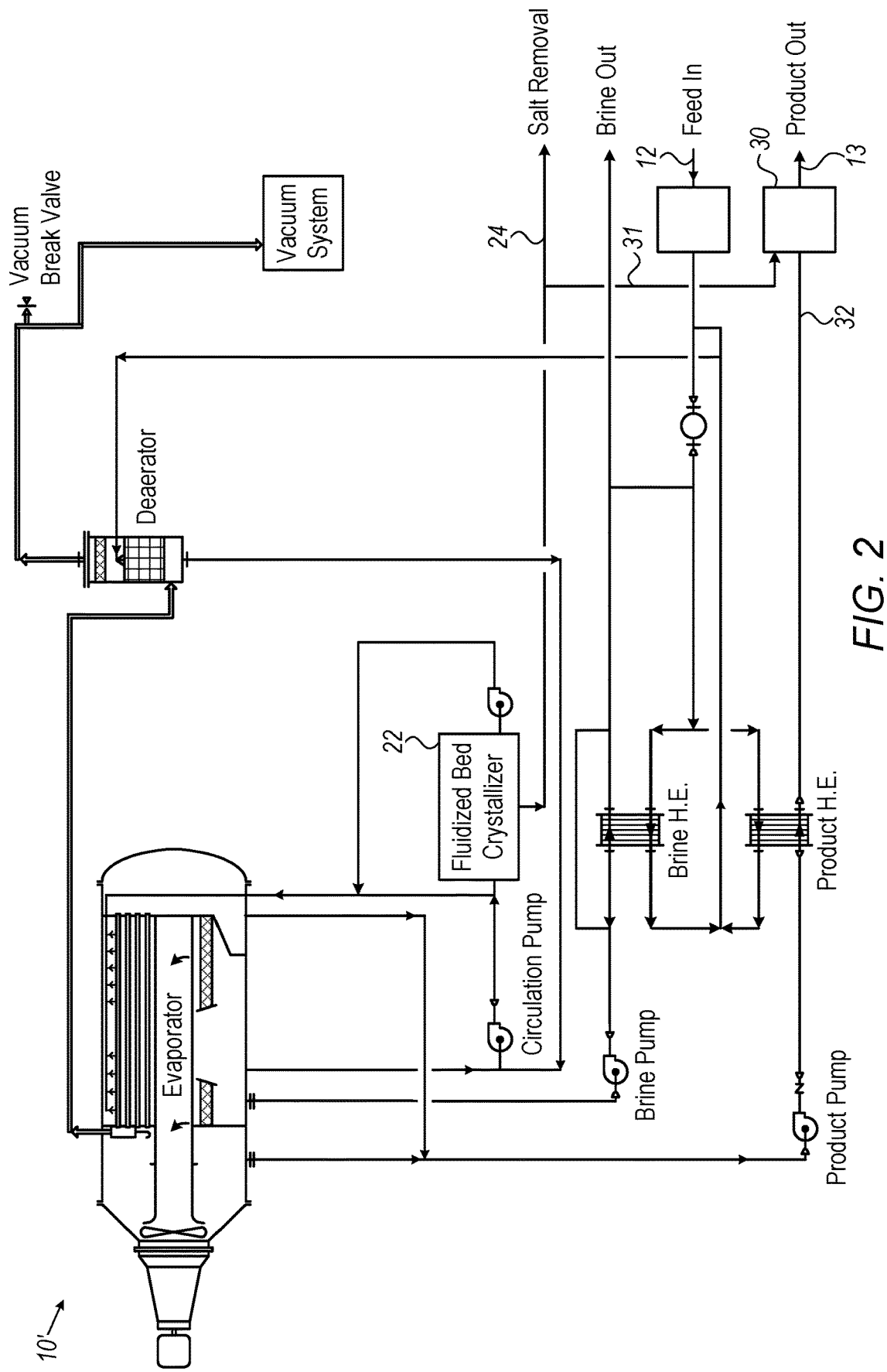
FIG. 2 shows a water treatment system similar to the water treatment system of FIG. 1 but provided with a pre- and post-treatment apparatus.

A further water treatment system is illustrated at 10' in FIG. 2, which is the same as the water treatment system of FIG. 1 in all respects except for the presence of pre- and post-treatment apparatuses. Product water generated from a water purification or distillation apparatus such as from the water treatment systems described herein must treated after purification to adjust the pH to approximately 8. Conventionally this is done performed for example by using carbonation or where appropriate by blending with source water. In this example which the appropriate post-treatment is provided by reintroducing minerals from the fluidized bed crystallizer 22. As shown at 30, a post-treatment apparatus receives removed minerals on line 31 from the fluidized bed crystallizer 22 and product water on line 32 from the MVC water treatment apparatus 11. The product water is treated with the recovered minerals to decrease the pH of the treated water to its desired level. The post-treatment apparatus 30 may be any suitable conventional apparatus as desired, depending on the form in which the removed minerals are received from the fluidized bed crystallizer 22. It will be apparent that this modification advantageously provides a simple and on-site method of treating the product water from apparatus 10'.

A pre-treatment apparatus is shown at 40 in FIG. 2. The feed water on line 12 may be treated as desired, for example to filter suspended particles or contaminants, or to adjust the pH of the feed water, or otherwise. It will be apparent that either apparatus 30, 40 may be omitted as suitable.

Figure 3:
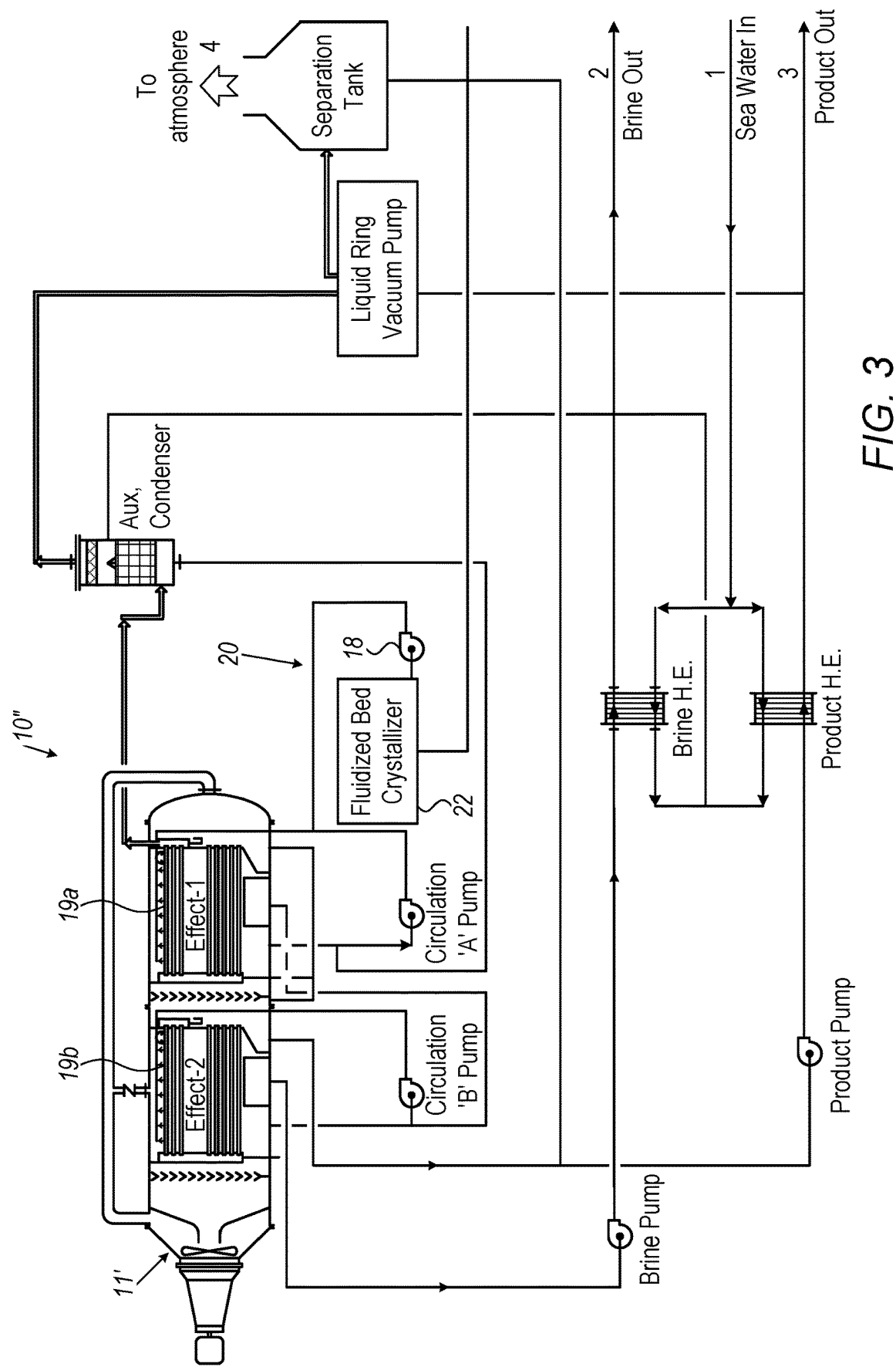
FIG. 3 shows a water treatment system similar to the water treatment system of FIG. 1 wherein the mechanical vapour compression water treatment apparatus comprises a plurality of effects.

FIG. 3 illustrates a water treatment system generally shown at 10". The system 10" is similar to water treatment system 10 of FIG. 1, but in this example comprises a mechanical vapour compression ("MVC") water treatment apparatus generally shown at 11' with two effects 19a, 19b. Pump 18a recycles feed water within effect 19a through recirculation circuit 20, while pump 18b receives feed water from the brine outlet of effect 19a and recycles the feed water within effect 19b. In this example, the recirculation circuit 20 and fluidized bed crystallizer 22 are connected and operate in like manner to the embodiment of FIG. 1. However, it will be apparent that a fluidized bed crystallizer may additionally or alternatively be located within a recirculation circuit supplying effect 19b, for example because the feed water circulating within effect 19b will have a higher connection of dissolved solids.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

Meanings of technical and scientific terms used herein are to be commonly understood as by one of ordinary skill in the art to which the invention belongs, unless otherwise defined.

The invention claimed is:

1. A method of treating water, comprising:
supplying feed water to a mechanical vapour compression apparatus having an evaporation/condensation vessel,
receiving recirculation water from an outlet of the evaporation/condensation vessel,
passing at least part of the recirculation water through a fluidized bed crystallizer to remove dissolved minerals from the at least part of the recirculation water, thereby enabling higher operating temperatures in the evaporation/condensation vessel, and
supplying the recirculation water to an inlet of the evaporation/condensation vessel.

2. The method of claim 1 wherein the dissolved minerals comprise one or more of magnesium compounds and calcium compounds.

3. The method of claim 1 further comprising receiving removed dissolved minerals from the fluidized bed crystallizer.

4. The method according to claim 1 further comprising receiving feed water, supplying the feed water to a deaerator, and passing at least some of the feed water from the deaerator to the fluidized bed crystallizer.

5. The method according to claim 1 further comprising post-treating product water from the mechanical vapour compression apparatus, receiving product water from the mechanical vapour compression apparatus, and reintroducing dissolved minerals from the fluidized bed crystallizer to the product water.

6. The method according to claim 1 wherein the higher operating temperatures comprise temperatures that would precipitate at least one of the dissolved minerals from the at least part of the recirculation water.

7. The method according to claim 1 wherein the dissolved minerals comprise calcium carbonate, and wherein the higher operating temperatures comprise temperatures that would precipitate the calcium carbonate.

* * * * *